(12) United States Patent
Weber et al.

(10) Patent No.: US 8,907,984 B2
(45) Date of Patent: Dec. 9, 2014

(54) GENERATING SLIDESHOWS USING FACIAL DETECTION INFORMATION

(75) Inventors: Ralf Weber, Santa Clara, CA (US); Robert Van Osten, Campbell, CA (US)

(73) Assignee: Apple Inc., Cupertino, CA (US)

( * ) Notice: Subject to any disclaimer, the term of this patent is extended or adjusted under 35 U.S.C. 154(b) by 1161 days.

(21) Appl. No.: 12/565,679

(22) Filed: Sep. 23, 2009

(65) Prior Publication Data

US 2011/0069085 A1 Mar. 24, 2011

(51) Int. Cl.
*G06T 11/60* (2006.01)
*G06T 13/80* (2011.01)

(52) U.S. Cl.
CPC ............. *G06T 13/80* (2013.01); *G06T 2210/22* (2013.01); *G06T 11/60* (2013.01)
USPC ............................ 345/634; 345/629; 345/474

(58) Field of Classification Search
CPC .......................... G06T 13/80; G06T 2210/22
USPC .......................................... 345/629, 634, 635
See application file for complete search history.

(56) References Cited

U.S. PATENT DOCUMENTS

| | | | |
|---|---|---|---|
| 5,736,974 A | 4/1998 | Selker | |
| 6,961,908 B2 | 11/2005 | Phillips | |
| 7,434,177 B1 | 10/2008 | Ording et al. | |
| 7,551,755 B1 * | 6/2009 | Steinberg et al. | 382/118 |
| 7,760,187 B2 | 7/2010 | Kennedy | |
| 2005/0105806 A1 * | 5/2005 | Nagaoka et al. | 382/224 |
| 2006/0204034 A1 * | 9/2006 | Steinberg et al. | 382/103 |
| 2008/0025566 A1 * | 1/2008 | Widdowson et al. | 382/103 |
| 2009/0022357 A1 * | 1/2009 | Katz | 382/100 |
| 2009/0031246 A1 | 1/2009 | Cowtan et al. | |
| 2009/0249210 A1 | 10/2009 | Sheldon et al. | |
| 2010/0171763 A1 | 7/2010 | Bhatt et al. | |

OTHER PUBLICATIONS

Dwayne Ferguson, Applie iLife 08 course, VTC Virtual Training Company Software Training, Mar. 3, 2008, downloaded from http://www.vtc.com/products/AppleiLife08/iPhoto/70648 on Sep. 18, 2012.*
Dwayne Ferguson, Applie iLife 08 course, VTC Virtual Training Company Software Training, Mar. 3, 2008, Internet Archive for http://www.vtc.com/products/AppleiLife08/iPhoto/70648 downloaded from http://web.archive.org/web/20090131230336/http://vtc.com/products/AppleiLife08/iPhoto/70648 on Sep. 18, 2012.*
Jackie Dove, iPhoto '09: What you need to know, Jan. 9, 2009, Macworld, downloaded from http://www.macworld.com/article/1138097/iphoto09_preview.html on Sep. 18, 2012.*
http://img.brothersoft.com/screenshots/softimage/p/photo_pilot-250695-1245724873.jpeg; Photo Pilot screen shot; Sep. 15, 2010; 1.
http://www.brothersoft.com/photo-pilot-250695.html; Download Free Photo Pilot, Photo Pilot 0.9.2.19 Beta Download; Sep. 15, 2010; 3.

* cited by examiner

*Primary Examiner* — Jeffery A Brier
(74) *Attorney, Agent, or Firm* — Fish & Richardson P.C.

(57) ABSTRACT

Methods and systems are presented for automatically generating a slide associated with a slideshow. In one aspect, a method includes selecting an image for inclusion in a slideshow, where the image has associated facial detection information. A face location is determined in the selected image based on the facial detection information and the selected image is cropped based on the determined face location to generate a cropped image depicting the included face. The cropped image is inserted into a slide associated with the slideshow. Further, an animation having a defined animation path can be associated with the slide. Also, the face location can be identified as a position in the animation path and the slide can be animated based on the associated animation.

35 Claims, 9 Drawing Sheets

GENERATING SLIDESHOWS USING FACIAL DETECTION INFORMATION

CROSS-REFERENCE TO RELATED APPLICATIONS

This application is related to co-pending U.S. patent application entitled "Effects Application Based On Object Clustering," U.S. patent application Ser. No. 12/499,672, filed Jul. 8, 2009, which claims priority to U.S. Provisional Patent Application 61/193,853, filed Dec. 30, 2008.

TECHNICAL FIELD

The present disclosure relates to facial detection with respect to digital images, and to using facial detection information associated with images in the automatic generation of a slideshow.

BACKGROUND

A slideshow is a popular format for presenting a collection of images alone or in conjunction with other information, such as text or audio. Slideshows have been used for a wide variety of purposes, including instruction, marketing, and entertainment. In some instances, the slideshow images are arranged sequentially or in accordance with image content to tell a story. Further, the pace of a slideshow can be controlled, whether the slides are advanced manually or automatically. For example, timing information can be associated with the slideshow to indicate when each slide is to be displayed.

Previously, slideshows have been implemented using projectors and slide carousels. More recently, media presentation applications have been developed to assist users with slideshow development and customization for computer-based implementations. The applications can include templates that provide either or both of graphical material, e.g. theme elements, and structural material, e.g. timing information and transitions. Theme elements can be used to customize slide appearance, including color schemes and slide layout. Further, preset timings and transitions can be used to advance the slideshow from one slide to the next. In some implementations, the preset timings and transitions can be modified for one or more slides to control the amount of time a particular slide is displayed or the manner in which one slide replaces another in the show.

Once a computer-based slideshow has been generated, the information associated with the slideshow, e.g. images and configuration data, can be stored to permit future retrieval. For instance, a generated slideshow can be stored on a Compact Disc (CD) or Digital Versatile Disc (DVD) as a presentation and accessed for playback on any compatible device. A slideshow also can be stored in an executable file, including in a streaming format, such that it can be accessed locally or over a communications network. Additionally, one or more rights management protections can be associated with a slideshow, such as to require a password to access the slideshow, to limit the period over which the slideshow can be accessed, or to limit one or more functions associated with the slideshow, including editing and printing slides.

SUMMARY

A slideshow can be automatically generated in accordance with facial detection information corresponding to one or more included images. For example, facial detection information associated with an image can be used to position the image within a slide or a slide template. Further, a portion of an image can be selected for use in a slide based on facial detection information that identifies the location of one or more faces in the image. Facial detection information also can be used to identify faces appearing in images that can be included or excluded from a slideshow.

One or more images also can be selected for inclusion in a slideshow based on faces appearing in the images. For example, an individual can be identified as a subject of a slideshow and images in which the individual appears can be automatically selected for inclusion in the slideshow. Further, facial detection information can be used to organize slides within a slideshow. For example, images featuring one or more common individuals can be clustered such that they appear in the same slide or sequential slides.

The present inventors recognized a need to use facial detection information associated with an image to determine the layout of a slide presenting that image. The need to crop an image, in accordance with facial detection information, to conform to a drop-zone included in a slide also was recognized. Further, the present inventors recognized the need to configure a slide such that one or more faces are visible during presentation of the slideshow.

The present inventors also recognized the need to allow animating a slide based on facial detection information associated with an included image. For example, the need to automatically detect a dominant face as a subject of the animation was recognized. Also, the present inventors recognized the need to permit animating a slide based on an automatic determination of one or more popular faces, e.g. with respect to the slideshow or an image collection. Additionally, the present inventors recognized the need to permit suggesting a slideshow style based on facial detection information corresponding to the images included in the slideshow. Accordingly, the techniques and apparatus described here implement algorithms for automatically generating a slideshow based on facial detection information associated with one or more associated images.

In general, in one aspect, the techniques can be implemented to include selecting an image for inclusion in a slideshow, the image having associated facial detection information, determining a face location in the selected image based on the facial detection information, cropping the selected image based on the determined face location to generate a cropped image depicting the included face, and inserting the cropped image into a slide associated with the slideshow.

The techniques also can be implemented such that selecting an image further includes determining that the image corresponds to a subject of the slideshow. Further, the techniques can be implemented to include determining a slide layout based on dimensions corresponding to the cropped image. Additionally, the techniques can be implemented to include identifying a drop-zone included in the slide and associating the cropped image with the identified drop-zone.

The techniques also can be implemented to include determining one or more drop-zone dimensions and generating the cropped image in accordance with the determined one or more drop-zone dimensions. Further, the techniques can be implemented such that cropping the selected image also includes defining a crop region such that the included face is positioned near a center of the cropped image. Additionally, the techniques can be implemented to include associating an animation with the slide, the animation having a defined animation path, identifying the face location as a position in the animation path, and animating the slide based on the associated animation.

In general, in another aspect, the techniques can be implemented to include accessing a slide associated with a slideshow, determining an animation starting position associated with the slide, wherein the animation starting position is based on facial detection information, determining an animation ending position associated with the slide, and presenting a slide animation, in accordance with an animation path, from the animation starting position to the animation ending position.

The techniques also can be implemented to include presenting a preceding slide associated with the slideshow, executing a transition from the preceding slide to the slide, and presenting the animation starting position associated with the slide. Further, the techniques can be implemented to include detecting an end of the slide animation and executing a transition from the slide to a succeeding slide. The techniques also can be implemented to include determining a starting crop associated with the slide, wherein the starting crop is based on facial detection information. Additionally, the techniques can be implemented such that the animation path includes a zoom with respect to a detected face location.

Other implementations of this aspect include corresponding systems, apparatus, and computer programs, configured to perform the actions of the methods, encoded on computer storage devices.

The techniques described in this specification can be implemented to realize one or more of the following advantages. For example, the techniques can be implemented such that one or more images can be positioned in a slideshow slide based, at least in part, on facial detection information. The one or more images can be positioned to keep included faces in the presentation. The techniques also can be implemented to permit cropping an image for use in a slideshow slide in accordance with facial detection information. Further, the facial detection information can be used to exclude one or more faces appearing in an image from use in the slideshow, such as using a size-based comparison. The techniques also can be implemented to organize images in one or more slides of a slideshow based on facial correlation information. Additionally, the techniques can be implemented to animate a slide in accordance with facial detection information, including information indicating whether a detected face is popular. The animation style used can be selected based on one or more previous slides that include animation.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
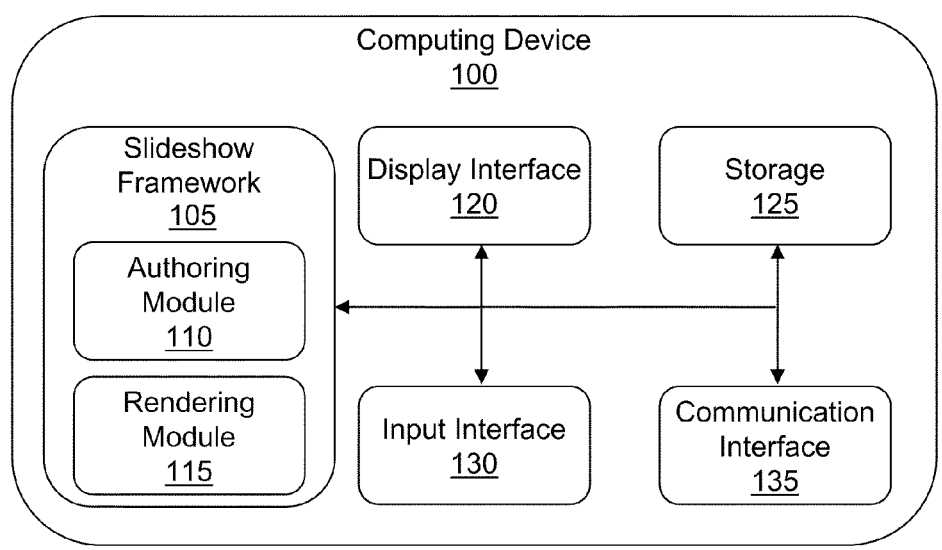
FIG. 1 shows an exemplary computing device hosting a slideshow framework that can be used to automatically generate a slideshow.

FIG. 1 shows an exemplary computing device hosting a slideshow framework that can be used to automatically generate a slideshow. Computing device 100 can be any computing apparatus, including a desktop computer, a laptop computer, a palm top computer, a work station, or a server. In some implementations, computing device 100 can be a virtual computing device implemented using two or more separate computers. Computing device 100 can include either or both of general and special purpose processors configured to execute instructions, such as application programs. One or more volatile memories, e.g. RAM, and/or nonvolatile memories, e.g. ROM, can be present in computing device 100 for storing data and instructions associated with application programs. Further, computing device 100 can be configured to host a slideshow framework 105, providing an application context in which slideshows can be generated and executed. In some implementations, slideshow framework 105 can be hosted as part of a parent application, such as iPhoto distributed by Apple Inc. of Cupertino, Calif.

Slideshow framework 105 can include an authoring module 110 and a rendering module 115. Authoring module 110 can be configured to access image data, including facial detection data, from an application program or a storage location, such as a memory address associated with computing device 100. Further, authoring module 110 can perform operations to insert the image data, or a portion thereof, into a slide associated with a slideshow. The operations can include functions such as determining an appropriate slide layout, cropping an image based on facial detection information, organizing images with respect to one or more slides, and animating a slide.

Authoring module 110 also can provide information defining a slideshow slide to rendering module 115. Rendering module 115 can be configured to receive information from authoring module 110 and to use that information to render one or more slides corresponding to a slideshow. For example, rendering module 115 can receive image data and an animation path, and can render a series of frames representing the animation of a slide. Rendering module 115 also can be configured to render slides without animation.

Further, computing device 100 can include a display interface 120, which can be configured to receive image data, e.g. from slideshow framework 105 and to generate output data for presentation on an associated display, such as a monitor or television. Storage 125 also can be associated with computing device 100 and can include a collection of images, e.g. one or more albums or galleries, from which a slideshow can be generated. One or more slideshows also can be saved in storage 125. In some implementations, storage 125 can encompass one or more remote storage devices, such as network accessible storage.

Computing device 100 also can include an input interface 130 through which input can be received, such as from a user. Input interface 130 can receive input from one or more physical input devices, such as a keyboard, key pad, mouse, touch screen, touch pad, track ball, joy stick, scroll wheel, microphone, stylus and tablet. Additionally, computing device 100 can include a communication interface 135, which can include one or more wired and/or wireless interfaces for communicating with other devices. For example, communication interface 135 can include a wired or wireless network adapter for transferring data over a public network, e.g. internet, a private network, e.g. local area network, or a combination thereof. Communication interface 135 also can include ports, e.g. universal serial bus and infrared, through which communications with one or more external devices can be executed.

Figure 2:
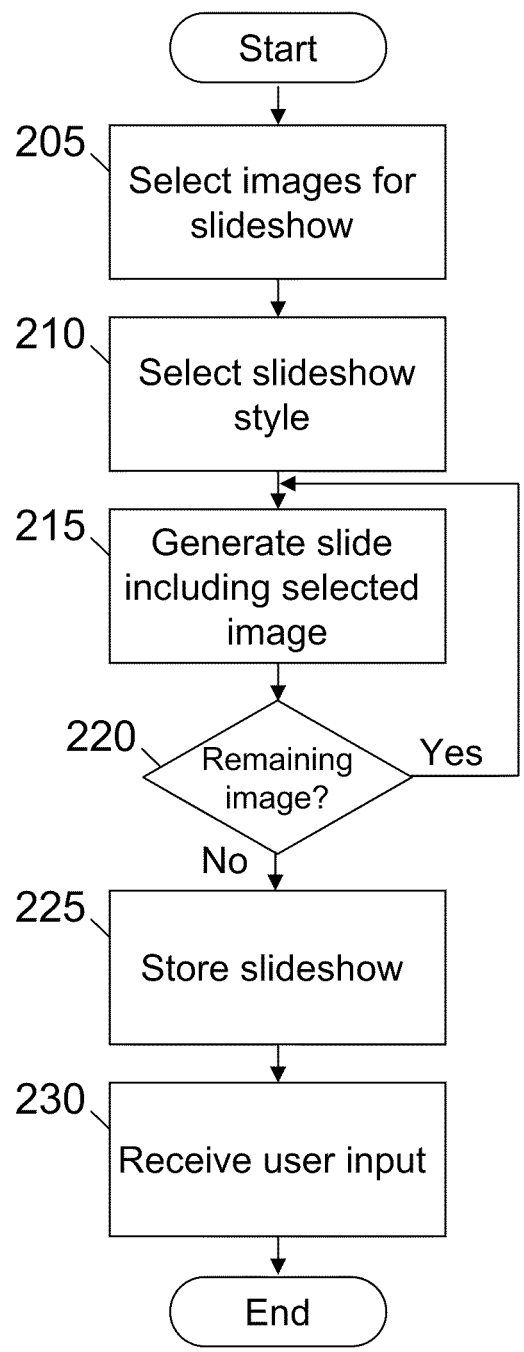
FIG. 2 shows a flow diagram describing an exemplary process for using facial detection information in automatically generating a slideshow.

FIG. 2 shows a flow diagram describing an exemplary process for using facial detection information in automatically generating a slideshow. Facial detection information can be used to correctly position images with respect to slides, e.g. such that a portion of a face is not cropped or otherwise obscured. Further, facial detection information can be used to persistently display a face, such as during an animation. Other image information, e.g. metadata, also can be used in automatically generating a slideshow. For instance, time/date metadata can be used in determining the slideshow order. Similarly, location metadata and/or facial correlation data can be evaluated to cluster related images in single slides or slide sequences.

The automatically generated slideshow can be a finished product that can be displayed, stored, and/or shared by a user. Alternatively, once generated, the slideshow can be edited or otherwise manipulated by a user. Automatic generation of the slideshow can be performed in the context of the slideshow framework discussed with respect to FIG. 1. The slideshow framework can receive input and data associated with generating a slideshow from numerous sources, including local and remote devices.

One or more images can be selected for inclusion in the slideshow (205). In some implementations, the images can be selected by a user. For example, a user can provide input identifying specific images, one or more galleries, one or more folders, or any combination thereof. In some other implementations, the images can be selected automatically. For example, a user can identify one or more subjects for which a slideshow is to be generated, such as a person, a location, an event, or a date. When a subject is identified, a number of images corresponding to that subject can be automatically selected. In the case of a person, facial detection and identification can be used to select images corresponding to the identified person from an image collection. Alternatively, images can be selected from a gallery featuring the identified person. The number of images included in a slideshow can be limited, e.g. based on number or size, or unlimited, such that all identified images are included.

A slideshow style also can be selected (210). A number of predetermined styles can be accessible, e.g. to the slideshow framework, for use in automatically generating a slideshow. A standard style can present a single image in each slide, using a full-screen, portrait, or landscape layout. A sliding panel style can reveal images included in the slideshow sequentially, such that one or more images are displayed while one or more other images are covered. Additionally, an animated style can be provided to give the appearance of motion video, such as using a Ken Burns animation. The slideshow style can be selected before or after the images are selected for the slideshow. A number of predefined slideshow styles can be available for use in automatically generating a slideshow. Further, the complexity of the slideshow styles can vary. For example, a simple slideshow style can include a full-resolution image per slide with a cross-dissolve transition. A more complex slideshow style can include predefined slide templates including one or more drop-zones, complex transitions, and animation. Other slideshow styles can be defined to incorporate elements of varying complexity.

In some implementations, a default slideshow style can be automatically selected. In some other implementations, a user can be prompted to select a slideshow style from available options. In still other implementations, a slideshow style can be selected in accordance with the images selected for the slideshow. For example, if facial detection information indicates that one or more faces appear in a majority of the selected images, a slideshow style appropriate for the presentation of images of people can be selected. Alternatively, if facial detection information indicates that only a few faces are included in the selected images, a slideshow style directed to another type of subject, e.g. landscapes, can be selected.

Other information also can be evaluated in selecting the slideshow style, including time/date metadata, location metadata, and comment metadata, such as a comment associating an image with a particular event or group. For example, location metadata indicating that a majority of the images were captured away from a home location can be used to select a travel slideshow style. Additionally, a slideshow style can incorporate one or more theme elements, such as colors, borders, graphics, and animation. Alternatively, one or more separately specified theme elements, e.g. birthday or beach, can be used to augment a slideshow style.

A selected image can be accessed and used to generate a slide (215). The image can be inserted in its entirety or cropped to generate one or more portions that can be inserted into the slide. Further, the image or image portion can be positioned in the slide in accordance with facial detection information. For example, an image can be aligned with respect to a slide such that a face is positioned near the center of the slide. Alternatively, one or more images can be positioned in the slide in accordance with a compositional rule, such as the rule of thirds. For instance, in accordance with the rule of thirds, a slide can be partitioned using two equally spaced horizontal lines and two equally spaced vertical lines. These dividing lines are notional and need not be depicted. An image can be positioned in the slide with reference to these lines and/or their intersections. For example, the image can be positioned in the slide such that an included face is centered at an intersection or such that a facial feature, e.g., the mouth, is aligned with one of the lines. Also, if two or more images or image portions are included in a single slide, the slide can be configured such that the included faces are not obscured.

Further, facial detection and facial correlation information can be used to cluster images that include related faces in a single slide or in sequential slides. For example, if two of the selected images include faces associated with Jake and Kelsey, a single slide can be generated from those images. Further, a group of selected images, each showing the faces of Jake, Kelsey, and Diego, can be clustered to form a series of sequential slides.

When a slide has been generated, an operation can be performed to determine whether all of the selected images have been used to generate slides (220). If at least one selected image remains that has not been used to generate a slide, another slide is generated that includes a remaining selected image (215). Otherwise, the slideshow can be stored (225). The slideshow can be stored in any format, including a streaming format, and on any memory medium. In some implementations, the slideshow can be stored in a read-only format to prevent further modification.

Additionally, user input can be received with respect to the slideshow (230). For example, a user can enter a command to initiate presentation of the slideshow, e.g. on a computer monitor or an associated displayed device. Alternatively, the slideshow can be presented automatically once it has been generated. A user also can access the slideshow, such as through an editing interface, to make one or more modifications. For example, the user can edit attributes such as the slideshow style, transitions, timing, slide order, and the included images. If a modification is made, the edited slideshow can replace the previous version or can be saved as a new slideshow.

Figure 3:
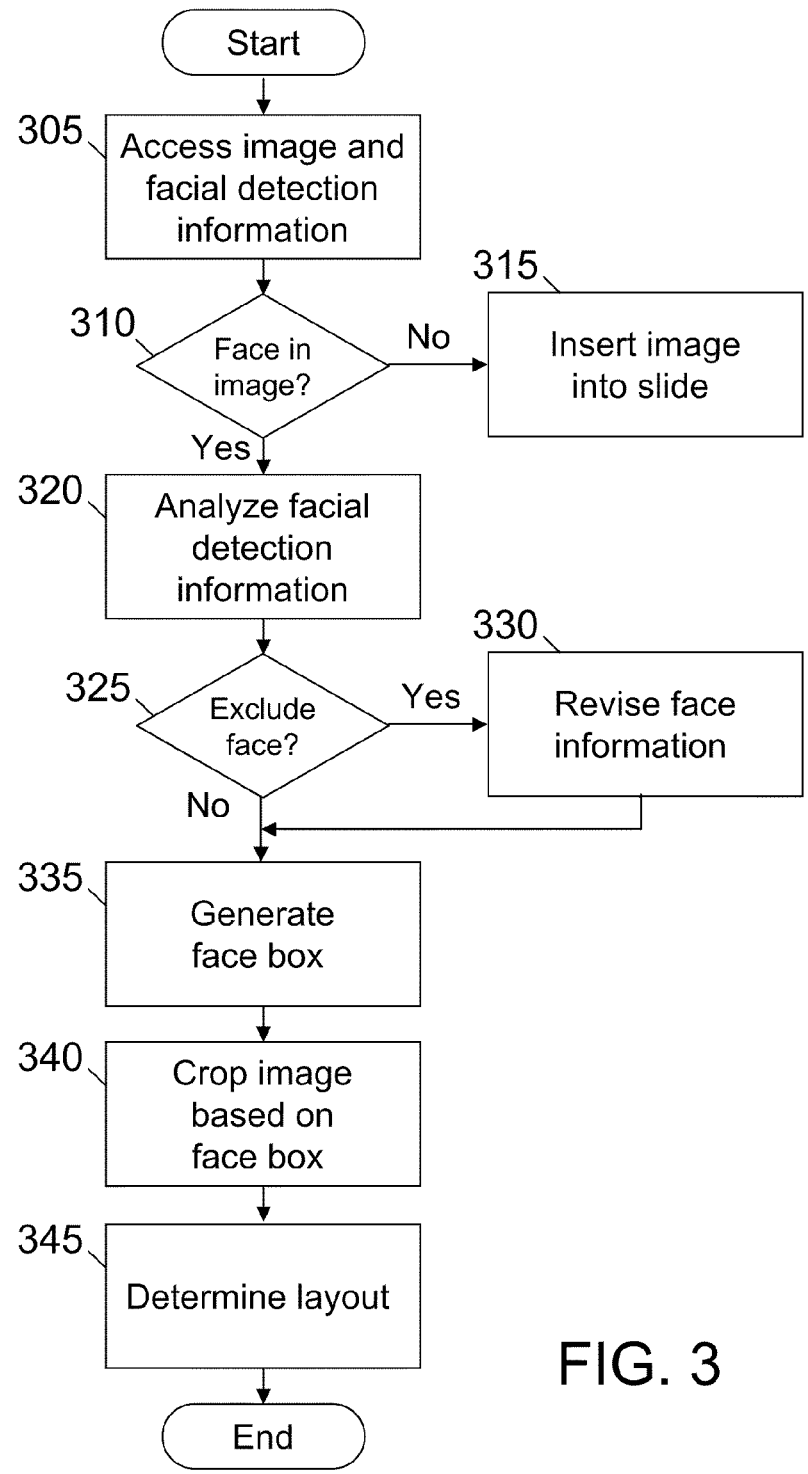
FIG. 3 shows a flow diagram describing an exemplary process for determining a layout for a slide based on facial detection information.

An image that is to be included in a slide can be cropped in accordance with facial detection information. Further, the layout of the cropped image with respect to the slide also can be determined based on facial detection information. FIG. 3 shows a flow diagram describing an exemplary process for determining a layout for a slide based on facial detection information. An image selected for inclusion in a slideshow and facial detection information corresponding to the image can be accessed (305). The facial detection information can be provided as one or more areas, e.g. rectangles, or coordinates associated with an image at which one or more faces have been detected. Based on the facial detection information, it can be determined whether at least one face is included in the image (310).

If no faces have been detected, the image can be inserted into the slide (315). Otherwise, the facial detection information can be analyzed (320). For example, the number and/or locations of detected faces can be determined. The size of each face, e.g. measured in pixels, also can be determined. In some implementations, the facial detection information also can be used for identification, such as to assess whether a detected face belongs to a known individual and/or to determine the popularity of the face. For instance, the slideshow framework can determine how many times a particular face appears in images included in the slideshow or in images stored in a collection.

Based on the analysis of facial detection information, the slideshow framework can determine whether to exclude a detected face (325). In some implementations, a detected face can be excluded based on size. For example, if the dimensions of the face fall below a predetermined threshold, the face can be excluded from consideration. The predetermined threshold can be expressed in terms of dimension, e.g. 100×100 pixels. Additionally or alternatively, the predetermined threshold can be expressed relative to one or more other detected faces. For example, if the size of the largest detected face (a dominant face) exceeds the size of a smaller detected face by a predetermined ratio, e.g. 3:1, the smaller detected face can be excluded from consideration.

In some other implementations, a detected face can be excluded if it is determined that the detected face does not belong to a subject of the slideshow and/or does not represent a popular face. For example, a face that appears only once (a singleton) in the selected slideshow images or a user's gallery can be presumed to be less relevant. In contrast, a face can be identified as a popular face if it appears in numerous images included in a particular collection, such as the selected slideshow images or a user's gallery. Additionally, both size and popularity can be evaluated in determining whether to exclude a face. For example, a face that smaller than a dominant face in an image by a predetermined threshold, such as half the size, and appears in only one image included in the slideshow can be excluded. In some implementations, an excluded face can still appear in the cropped image depending on its location relative to other detected faces.

If it is determined that a face can be excluded, the face information associated with the image can be revised (330). For example, facial detection information corresponding to the excluded face can be deleted or flagged such that it is no longer considered by the slideshow framework. If no detected faces are to be excluded, or after the face information has been revised, a face box can be generated for the image (335). The face box can define the region in which all of the detected faces that are to be included in the image appear. Further, the image can be cropped based on the face box (340). In some implementations, the image can be cropped to the dimensions of the face box. In other implementations, the image can be cropped to also include at least a portion of the image located outside of the face box.

Additionally, the layout of the slide can be determined based on the cropped image (345). For example, if the horizontal dimension of the cropped image exceeds the vertical dimension, a landscape layout can be used. Alternatively, if the vertical dimension of the cropped image exceeds the horizontal dimension, a portrait layout can be selected. In some implementations, the layout can be selected based on the dimensions of the face box and the image can be cropped to conform to an aspect ratio of the selected layout.

Figure 4:
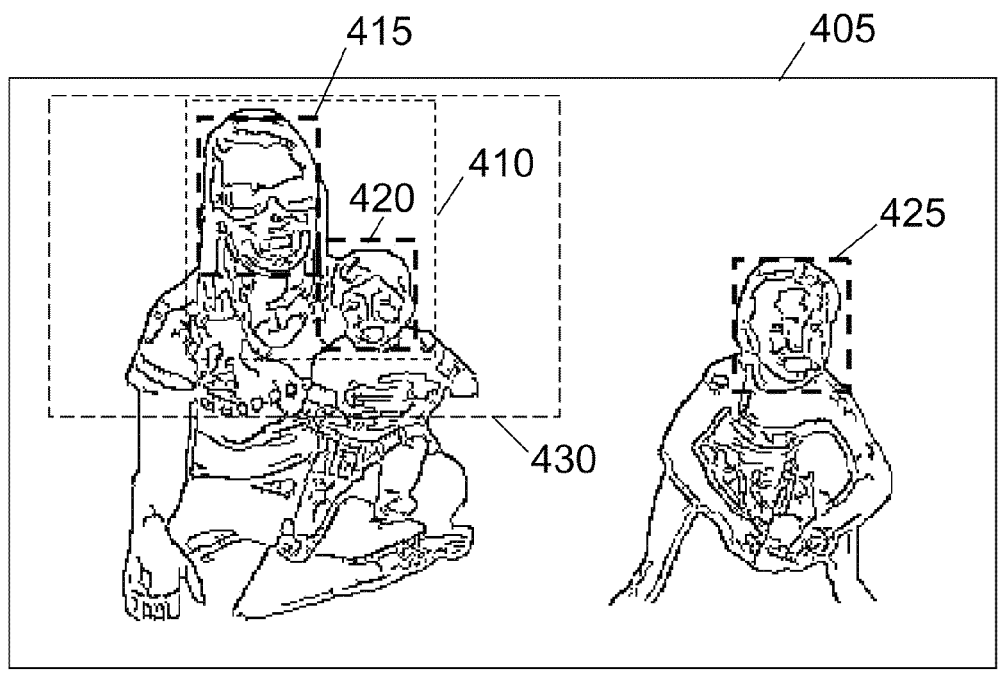
FIGS. 4 and 5 show example images that can be cropped for use in a slide based on facial detection information.

In addition to using entire images, a slide in an automatically generated slideshow can be created using one or more cropped image portions. FIG. 4 shows an example image that can be cropped for use in a slide based on facial detection information. Multiple faces can appear in image 405. The location of detected faces can be identified by facial detection information, such as face rectangles (or rects) 415, 420, and 425. The facial detection information can be maintained separately, but associated with image 405 such that the facial detection information can be made available for use in conjunction with image 405. For example, the facial detection information can be made available to components within the slideshow framework, such as processes and modules, for use in generating the slideshow.

Further, the facial detection information can be processed to determine one or more regions of image 405 that are to be included in a slide. In some instances, all of the detected faces can be included and a face box can be generated that contains each of the face rectangles 415, 420, and 425. Image 405 can then be cropped based on the generated face box, such as to match the dimensions or a desired aspect ratio of the slide or a drop-zone within the slide.

In some other instances, the facial detection information can be further processed to determine whether one or more detected faces can be excluded. For example, the sizes of the faces appearing in image 405 can be evaluated and faces that are determined to be too small can be excluded. Each of the face rectangles 415, 420, and 425 can be compared to a size threshold. The size threshold can be a fixed dimension for all images, such as 100×100 pixels. Alternatively, the size threshold can be determined based on the dimensions of the image, such that the threshold represents a minimum portion, e.g. 10 percent, of the whole image. The threshold also can be determined based on the size of the largest face (the dominant face). For example, the threshold can represent a ratio, e.g. 3:1 or 4:1 between the size of the largest face and the size of the face being evaluated. If size of the largest face exceeds the size of the face being evaluated by more than the ratio, the face being evaluated can be excluded. Thus, a small face, such as a face in the background, can be excluded from the determination of which portion of the image is to be included in the slide. However, an excluded face can nonetheless be included within the boundaries of the cropped image portion used for the slide.

Facial detection information also can be used to evaluate the popularity of one or more faces appearing in the image. In some implementations, popularity can be used independently as an exclusion factor. In other implementations, popularity can be evaluated in conjunction with additional factors, such as size and proximity to a popular face. For example, the faces depicted in face rectangles 415, 420, and 425 each can be evaluated to determine how many times they appear in a relevant collection of images, such as the selected images for the slideshow or a user's gallery. If a face appears only a few times, e.g. once or twice, in the relevant collection, the face can be excluded from consideration. The faces depicted in face rectangles 415, 420, and 425 also can be evaluated to determine whether they match a subject of the slideshow. In some implementations, if a face corresponds to a subject of the slideshow, the face can be included without regard to other factors.

Analysis of the facial detection information can indicate one or more faces to exclude from consideration in selecting the image portion for the slide. For example, with respect to image 405, it can be determined that the face represented by face rectangle 425 appears only once in the selected slideshow images. Thus, face rectangle 425 can be excluded from consideration and face box 410 can be generated with respect to face rectangles 415 and 420. Face box 410 indicates the portion of image 405 that includes faces to be shown in the slide. Further, a crop region 430 can be generated that contains face box 410 and optionally contains additional portions of image 405. In some implementations, the dimensions of crop region 430 can be determined based on a slide target region, e.g. a drop-zone, into which the selected image portion will be inserted. The dimensions of crop region 430 can be the same as those of the target region or can represent a scaled version of the target region dimensions. Additionally, the slide layout can be determined, at least in part, by the dimensions of either or both of face box 410 and crop region 430. For example, a landscape layout can be used if the horizontal dimension of crop region 430 exceeds the vertical dimension, while a portrait layout can be used if the vertical dimension of crop region 430 exceeds the horizontal dimension.

Figure 5:
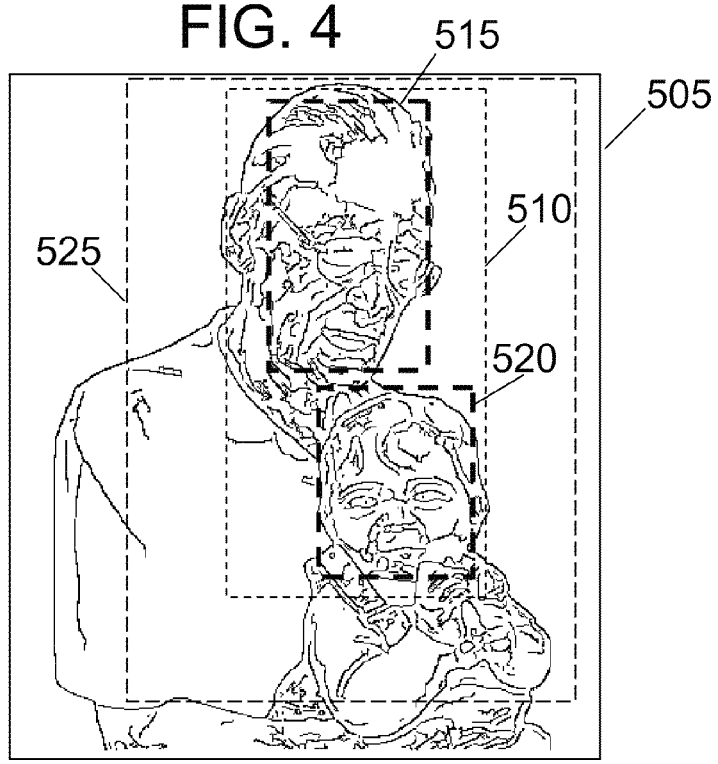

FIG. 5 also shows an example image that can be cropped for use in a slide based on facial detection information. Image 505 includes multiple detected faces identified by facial detection information. The locations in which the detected faces appear are identified by face rectangles 515 and 520. A face box 510 can be generated to identify the portion of image 505 that includes faces to be shown in the slide. In some implementations, face box 510 can be generated in accordance with an evaluation of facial detection information associated with image 505. For example, face box 510 can be generated after the facial detection information associated with image 505 has been evaluated or can be modified as necessary based on an evaluation of the facial detection information. Further, a crop region 525 can be generated that contains face box 510. Because the alignment between the detected faces is vertical in image 505, as indicated by the dimensions of face box 510, crop region 525 can be defined using dimensions corresponding to a portrait layout.

In some instances, several different portions of an image can be used in generating a slideshow. For instance, different people can be separately cropped from an image and the cropped portions can be used to generate one or more slides.

Figure 6:
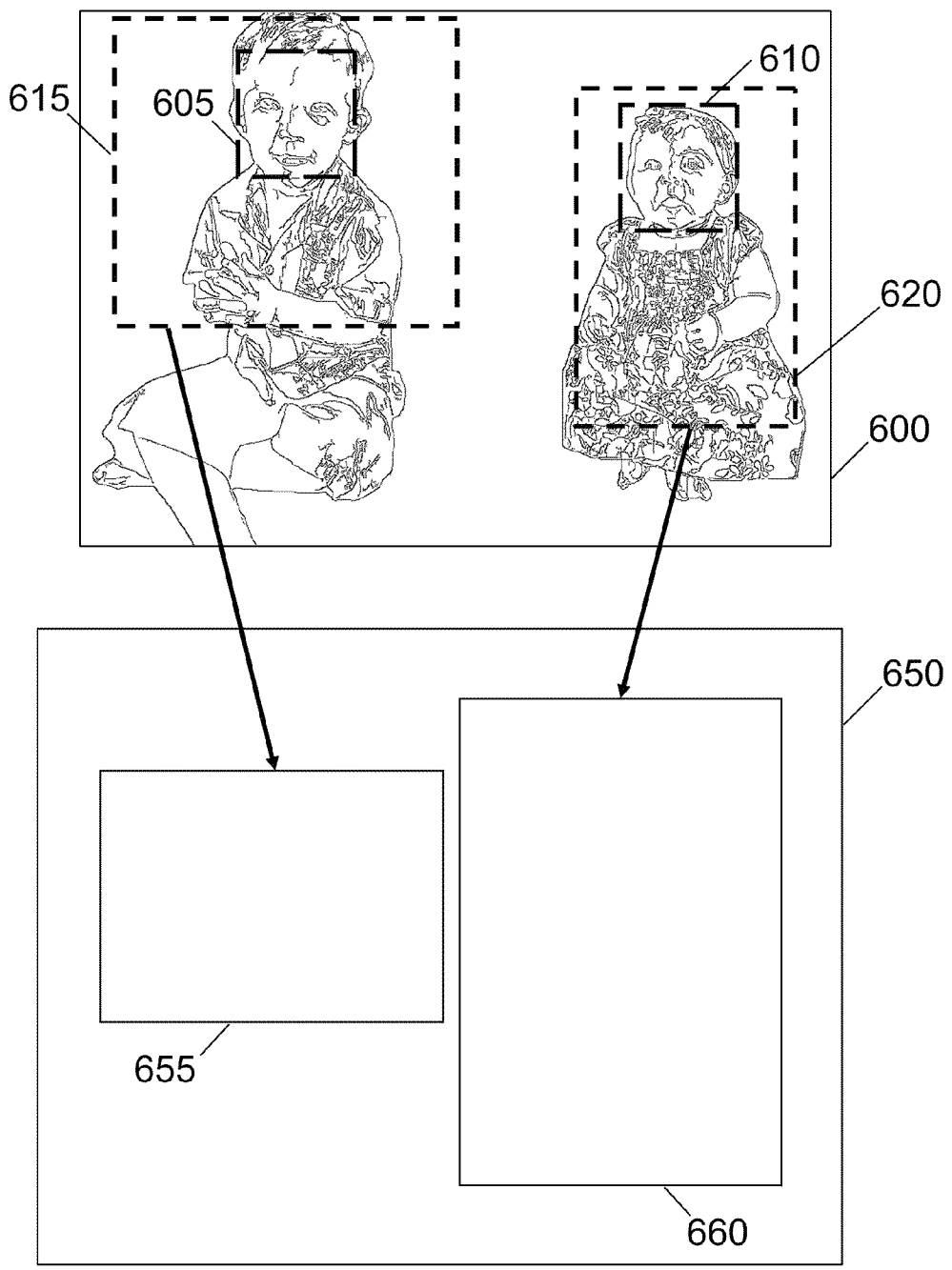
FIG. 6 shows an example of cropping multiple portions of an image for use in a slideshow based on facial detection information.

FIG. 6 shows an example of cropping multiple portions of an image for use in a slideshow based on facial detection information. Image 600 can be used to automatically generate one or more slides in a slideshow, such as slide 650. Facial detection information can indicate one or more detected faces appearing in image 600, such as faces associated with facial rectangles 605 and 610. The facial detection information associated with image 600 can be analyzed to determine how image portions are to be represented in slide 650. For example, it can be determined that only two detected faces, represented by facial rectangles 605 and 610, appear in image 600. It also can be determined that the distance between the facial rectangles 605 and 610 exceeds a threshold amount, e.g. two inches or a quarter of the horizontal dimension of the image. Thus, separate image portions can be generated from image 600, corresponding to facial rectangles 605 and 610.

A first cropped region 615 can be generated that includes face rectangle 605. The dimensions of first cropped region 615 can be determined based on the configuration of the target slide. For instance, if first cropped region 615 will be the only content in the slide, the dimensions of first cropped region 615 can be selected based on the display region of the slide. Other factors, including image resolution, also can be evaluated in determining the dimensions of first cropped region 615. Alternatively, if first cropped region 615 will be presented in a particular drop-zone of the target slide, the dimensions of first cropped region 615 can be determined in accordance with the dimensions of the corresponding drop-zone. For example, first cropped region 615 can be associated with a first drop-zone 655 in slide 650. Thus, the dimensions of first cropped region 615 can be selected based on the dimensions of first drop-zone 655.

A second cropped region 620 that includes face rectangle 610 also can be generated. Second cropped region 620 can be associated with a second drop-zone 660 in slide 650. Thus, the dimensions of second cropped region 620 can be selected based on the dimensions of second drop-zone 660. In some implementations, a corresponding drop-zone can be selected based on the dimensions of a cropped region.

Figure 7:
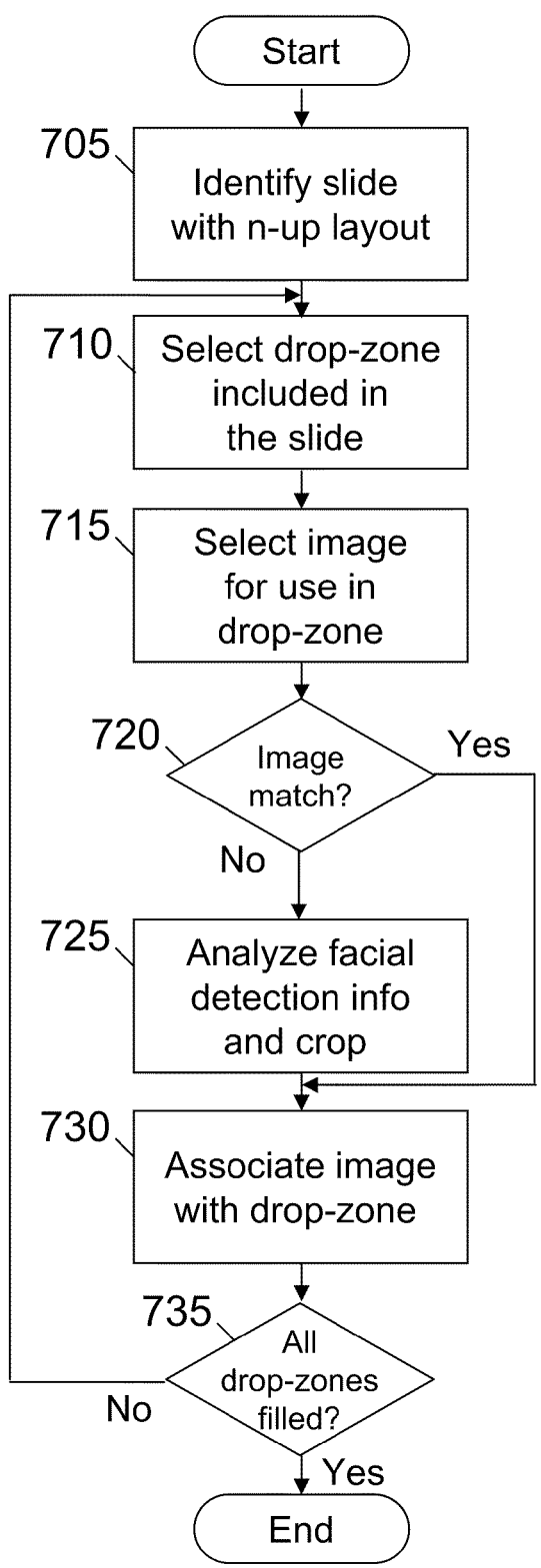
FIG. 7 shows a flow diagram describing an exemplary process for determining a layout, based at least in part on facial detection information, for a slide including multiple drop-zones.

One or more slides included in an automatically generated slideshow can be configured to have multiple drop-zones into which images and/or portions of images can be inserted. This type of slide format can be referred to as an n-up layout. Any number of drop-zones can be included in an n-up layout, and the drop-zones can be of varying sizes and orientations. For example, an 3-up layout can include one large portrait drop-zone and two smaller landscape drop-zones. In some instances, the drop-zones included in an n-up layout slide are fixed and an image or image portion must be conformed to fit a drop-zone. FIG. 7 shows a flow diagram describing an exemplary process for determining a layout, based at least in part on facial detection information, for a slide including multiple drop-zones.

A slide associated with the automatically generated slideshow that has an n-up layout can be identified (705). One or more characteristics of the drop-zones included in the slide can be determined, such as size, aspect ratio, and orientation. One of the drop-zones included in the slide can be selected (710). Further, an image can be selected for use in that drop-zone (715). An image can be selected from the identified slideshow images randomly or the next available image can be used. Alternatively, an image can be selected to fill the drop-zone based on one or more factors. For example, a subset of the identified slideshow images can be selected for use in a particular slide based on a common pattern, such as time, location, and/or people. The time and location associated with an image can be determined from image metadata, which can be compared to identify other images with the same or similar values. Further, one or more people represented in an image can be determined based on facial detection information. For instance, facial detection information associated with an image can identify a named individual corresponding to a detected face. Additionally or alternatively, detected faces associated with the slideshow images can be compared, e.g. using facial characteristics, to correlate images in which one or more of the same individuals appear. In some implementations, an image featuring at least one large representation of a face also can be associated with one of the largest drop-zones included in the slide. Thus, one or more faces can be emphasized in a slideshow.

When an image is selected for use in a drop-zone, it can be determined whether the dimensions of the image match the dimensions of the drop-zone (720). An image can match a drop-zone even if their dimensions differ, such as if the difference is one of scale or the variance is very small. If the dimensions match, the image can be associated with the corresponding drop-zone (730). Otherwise, facial detection information associated with the image can be analyzed, and the image can be cropped in accordance with the facial detection information (725). In performing the analysis, the location of one or more detected faces included in the image can be identified using the facial detection information. Also, one or more factors, e.g. size and popularity, can be evaluated to determine whether any of the detected faces can be excluded. A crop region can be determined based on the analysis, indicating the portion of the image to be associated with the drop-zone.

The crop region can be defined such that the detected faces that were not excluded are fully shown in the crop region. Further, the crop region can be defined such that one or more faces are positioned in or near the center of the drop-zone. Alternatively, the crop region to be associated with the drop zone can be defined in accordance with a compositional rule, such as the rule of thirds. In accordance with the rule of thirds, an image, e.g. the crop region, can be partitioned using two equally spaced horizontal lines and two equally spaced vertical lines. Thus, the crop region can be defined such that one or more identified faces are aligned with respect to one or more of the dividing lines or intersections between the dividing lines corresponding to the cropped region.

The orientation of the image also can be altered by defining the crop region to correspond to the associated drop-zone. For example, a crop region with a portrait orientation can be defined in an image characterized by a landscape orientation. Additionally, the alignment of the one or more detected faces with respect to the crop region also can vary. In some implementations, the crop region can be defined such that the one or more detected faces that have not been excluded are centered in the crop region. Thus, the additional portions of the image that are included in the crop region will be equally spaced around the one or more faces. In some other implementations, the crop region can be defined such that more of a particular portion of the image is selected. For example, the facial detection information, e.g. the position of the mouth and eyes, can indicate an orientation of a detected face relative to the image. The crop region can be defined to include more of the region below the face, which corresponds to a person, and less of the region above the face, which corresponds to background, such as a wall or sky.

The cropped image can be associated with the corresponding drop-zone (730). Further, it can be determined whether all of the drop-zones included in the slide have been filled (735). If any of the drop-zones remains unfilled, an unfilled drop-zone can be selected (710).

Figure 8:
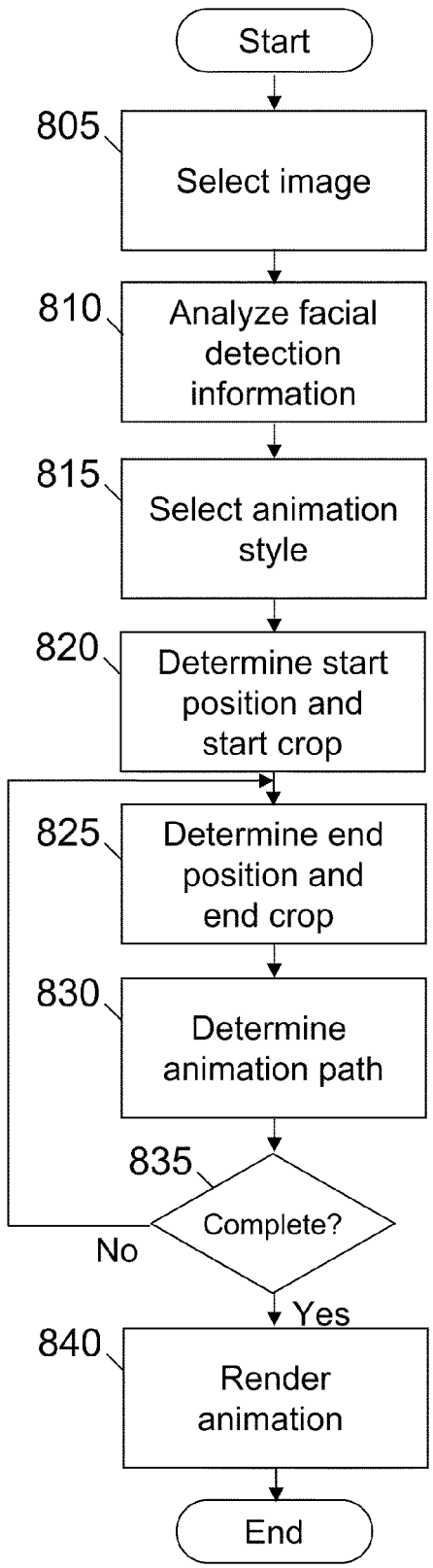
FIG. 8 shows a flow diagram describing an exemplary process for automatically generating an animated slide.

One or more slides included in an automatically generated slideshow also can be animated. The animation can include any type of effect, including pan, zoom, and rotation. In some implementations, animation can be selected based on the type of slideshow selected. For instance, a slideshow type can include animation as a feature for most of all of the slides. In other implementations, animation can be selected based on slide content. For example, a slide presenting an image in which two people who are subjects of the slideshow are depicted apart from one another can be animated to present a zoomed view of each person individually. The animation can be automatically generated based, at least in part, on facial detection information associated with the image. FIG. 8 shows a flow diagram describing an exemplary process for automatically generating an animated slide.

An image to be included in the slide can be selected (805). In some implementations, an identifier, e.g. a flag, can be associated with the image to indicate that the image is to be animated. Further, facial detection information associated with the image can be analyzed (810). For example, the number of detected faces associated with the image, as well as the size and location of those faces can be determined. In some implementations, the popularity of one or more of the detected faces also can be evaluated, e.g. to determine which faces correspond to frequently photographed people and which faces are singletons.

The animation style to be used in animating the slide also can be selected (815). For instance, the slideshow framework can include or have access to a number of animation templates that can be modified in accordance with facial detection information to animate a slide. In some implementations, an animation style can be selected randomly. In some other implementations, an animation style can be selected based on previous use, such that the same animation is not performed repeatedly. In still other implementations, an animation style can be selected based on the facial detection information, e.g. in response to the location and/or size of detected faces.

An animation path specifying how the slide is to be animated also can be defined. In some implementations, the animation can be represented as a single animation segment from a starting point to an ending point. In some other implementations, the animation can be a multi-point animation that includes multiple animation segments. A starting position and a starting crop for the animation can be determined (820). The starting position identifies the point from which the animation begins and the starting crop identifies that portion of the image that is presented at the start of the animation. During a slideshow presentation, the slide can be presented at the starting position and starting crop, such as upon transition from a preceding slide. For instance, the animation can begin centered on a particular face and the image can be cropped (or zoomed) such that only the face is presented. Alternatively, the starting image (or view) of the animation can be defined in accordance with a compositional rule, such as the rule of thirds. Thus, an included face can be positioned in the image with respect to a dividing line or an intersection between dividing lines corresponding to the starting image. Further, an ending position and an ending crop also can be determined (825). The ending position identifies the point at which the animation segment ends and the ending crop identifies the portion of the image this is presented at the end of the animation. For instance, the animation can end centered on a different face and the image can be cropped (or zoomed) such that multiple faces are presented. Alternatively, the ending image (or view) can be defined in accordance with a composition rule. Further, during a slideshow presentation, a transition to a succeeding slide can be performed after the last animation segment has been presented.

The animation path connecting the starting and ending positions also can be determined (830). The animation path can be a straight line between the starting and ending points or can be curved in any manner. Further, the animation path also can include rotation. For example, an image can be rotated 180 degrees, such that a face that was upside down at the start of the animation is right side up at the end. An image also can be rotated more than 360 degrees in an animation, such that the image spins during presentation of the slide. Further, rotation can be performed in conjunction with zooming in or out, such that the crop region of the image increases or decreases while the image portion is being rotated. Additionally, the animation path can include timing information, indicating how quickly the animation path is to be traversed.

Once the animation path between two points has been defined, it can be determined whether the animation is complete (835). If the animation is not complete, the previous end position and end crop can be used as the start position and start crop of the next animation segment, and an additional end position and end crop can be determined (825). Otherwise, if the animation is complete, the defined animation path can be used to render the animation (840). For example, an authoring module in the slideshow framework can pass the animation path to a rendering module in the slideshow framework. Through rendering, a number of separate images or frames depicting the animation can be generated. When played back, the rendered frames show movement of the image with respect to a viewer's perspective, including zooming, panning, and rotation. The animation can be rendered in accordance with the timing information, e.g. at a matching frame rate, or timing information can be associated with each rendered image or frame.

Figure 9:
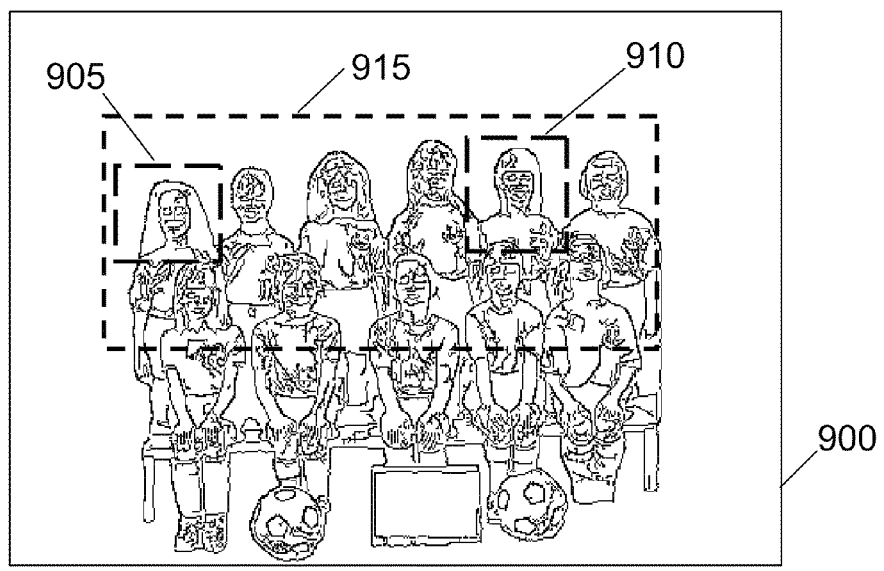
FIG. 9 shows an example of animation in a slide based on facial detection information.

One or more programmed animations can be used to automatically animate a slide, such as in accordance with a Ken Burns technique. Facial detection information associated with a slide image can be used to identify one or more points in the animation. Other elements of the animation, such as timing, panning, and zooming can be predetermined. Thus, an animation that presents faces in greater detail can be automatically generated. FIG. 9 shows an example of animation in a slide based on facial detection information. A slide 900 representing an image, e.g. a soccer team, can be animated as part of a slideshow. Detected faces appearing in slide 900 can be analyzed to identify one or more topics of the animation. For instance, detected faces 905 and 910 can be selected as topics of a multi-point animation. Faces 905 and 910 can be given priority over other detected faces appearing in slide 900 based on a variety of factors. For example, faces 905 and 910 can represent named or known individuals, can occur more frequently in a relevant image collection than other faces appearing in slide 900, or can be selected based on one or more image characteristics, including size, sharpness, and brightness.

Any location in slide 900 can be selected as a starting point of the animation and any portion of slide 900 can be displayed. For instance, the animation can begin centered on slide 900, with all of slide 900 being displayed. The animation can advance to a second point, such as face 905. In advancing the animation, the field of view with respect to slide 900 can be altered using one or more cinematic effects, e.g. panning and zooming, such that face 905 is presented at an increased zoom level and positioned in the center of the field of view. Further, the rate at which the animation advances can vary, e.g. based on the change in position and zoom level between the starting point and the second point.

After the second point, face 905, in the animation has been reached, the animation can advance to a third point, such as face 910. The field of view of slide 900 can be grown by zooming out from the second point. Further, the field of view can be changed by panning. For example, face 905 can be continuously displayed while the field of view is grown and panned, until face 910 also is visible, e.g. such that portion 915 of slide 900 is displayed. The animation can continue until the third point is reached, e.g. face 910 is presented at an increased zoom level and is positioned in the center of the field of view. The path and timing of the animation can vary and can include additional elements, such as rotation about one or more axes.

Figure 10:
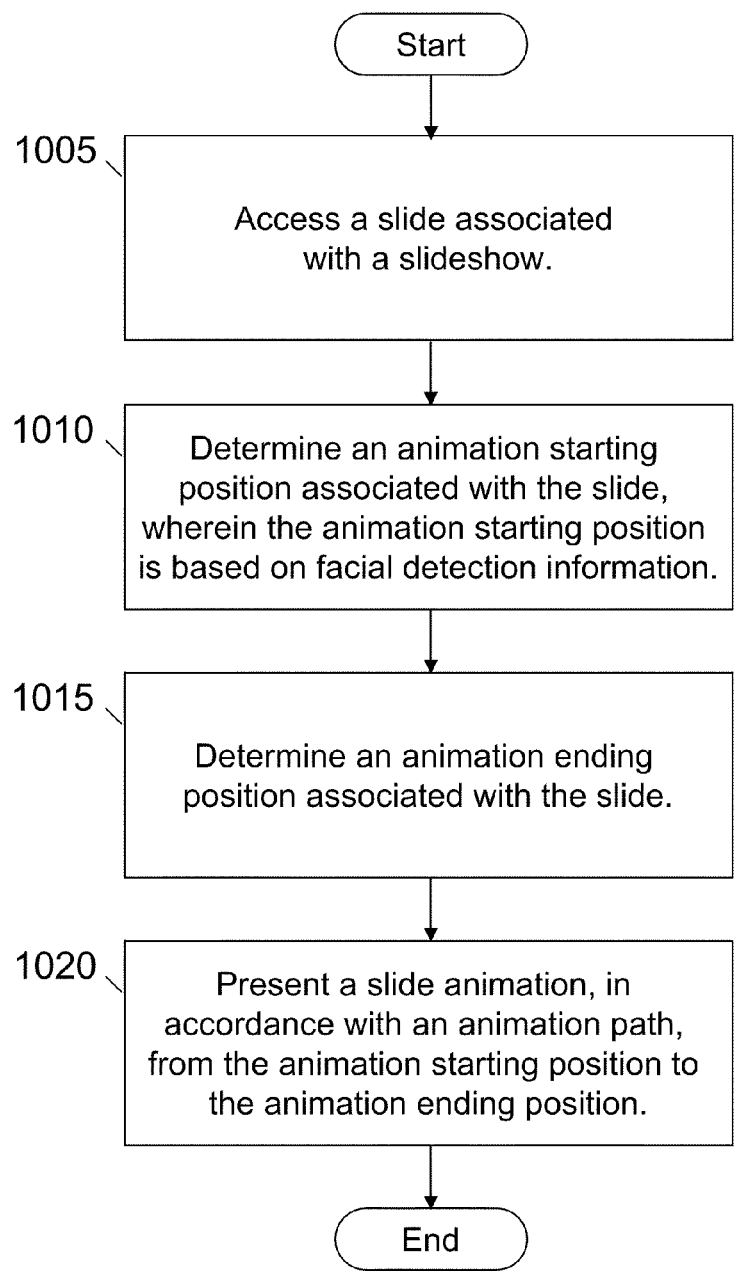
FIG. 10 shows an example of presenting a slide associated with a slideshow.

FIG. 10 shows an example of presenting a slide associated with a slideshow. A slide associated with a slideshow can be accessed (1005). The slide can be accessed at any point during a slideshow, such as in conjunction with a transition from a preceding slide. Facial detection information, e.g., identifying the location of one or more faces included in an image represented by the slide, can be associated with the slide. An animation starting position associated with the slide can be determined (1010). The animation starting position can be based on facial detection information. For instance, the starting position can represent a bounded region that includes part or all of one or more faces. Further, a starting crop associated with the slide also can be determined based on facial detection information. The starting crop can define an initial view with respect to the slide.

An animation ending position associated with the slide also can be determined (1015). Further, a slide animation can be presented from the animation starting position to the animation ending position, in accordance with an animation path (1020). The animation path can have any shape, such as curved or straight. Also, the animation path can include one or more changes in field, including zooming and rotation. If no additional animation segments are defined with respect to the slide, the end of the slide animation can be detected when the animation ending position is reached and a transition to a succeeding slide can be executed.

The techniques and functional operations described in this disclosure can be implemented in digital electronic circuitry, or in computer software, firmware, or hardware, including the structural means described in this disclosure and structural equivalents thereof, or in combinations of them. The techniques can be implemented using one or more computer program products, e.g., machine-readable instructions tangibly stored on computer-readable media, for execution by, or to control the operation of one or more programmable processors or computers. Further, programmable processors and computers can be included in or packaged as mobile devices.

The processes and logic flows described in this disclosure can be performed by one or more programmable processors executing one or more instructions to receive, manipulate, and/or output data. The processes and logic flows also can be performed by programmable logic circuitry, including one or more FPGAs (field programmable gate arrays), PLDs (programmable logic devices), and/or ASICs (application-specific integrated circuits). General and/or special purpose processors, including processors of any kind of digital computer, can be used to execute computer programs and other programmed instructions stored in computer-readable media, including nonvolatile memory, e.g. read-only memory, volatile memory, e.g. random access memory, or both. Additionally, data and computer programs can be received from and transferred to one or more mass storage devices, including hard drives, flash drives, and optical storage devices. Further, general and special purpose computing devices and storage devices can be interconnected through communications networks. The communications networks can include wired and/or wireless infrastructure, and can be public and/or private.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method of generating a slide, the method comprising:
   selecting an image for inclusion in a slideshow, the image having associated facial detection information;
   determining a face location in the selected image based on the facial detection information;
   cropping the selected image based on the determined face location to generate a cropped image depicting the included face;
   determining a slide layout based on dimensions corresponding to the cropped image; and
   inserting the cropped image into a slide associated with the slideshow.

2. The computer-implemented method of claim 1, wherein selecting an image further comprises:
   determining that the image corresponds to a subject of the slideshow.

3. The computer-implemented method of claim 1, further comprising:
   identifying a drop-zone included in the slide; and
   associating the cropped image with the identified drop-zone.

4. The computer-implemented method of claim 3, further comprising:
   determining one or more drop-zone dimensions; and
   generating the cropped image in accordance with the determined one or more drop-zone dimensions.

5. The computer-implemented method of claim 1, wherein cropping the selected image further comprises:
   defining a crop region such that the included face is positioned near a center of the cropped image.

6. The computer-implemented method of claim 1, further comprising:
   associating an animation with the slide, the animation having a defined animation path;
   identifying the face location as a position in the animation path; and
   animating the slide based on the associated animation.

7. A computer program product, encoded on a non-transitory computer-readable storage device, operable to cause data processing apparatus to perform operations comprising:
   selecting an image for inclusion in a slideshow, the image having associated facial detection information;
   determining, based on the facial detection information, a face region in the selected image that includes one or more faces;
   cropping the selected image based on the determined face region to generate a cropped image depicting the included one or more faces;
   determining a slide layout based on dimensions corresponding to the cropped image; and
   inserting the cropped image into a slide associated with the slideshow.

8. The computer program product of claim 7, wherein selecting an image further comprises:
   determining that the image corresponds to a subject of the slideshow.

9. The computer program product of claim 7, further operable to cause data processing apparatus to perform operations comprising:
   identifying a drop-zone included in the slide; and
   associating the cropped image with the identified drop-zone.

10. The computer program product of claim 7, further operable to cause data processing apparatus to perform operations comprising:
    generating the slide such that the face region is aligned with a center of a display area.

11. The computer program product of claim 7, further operable to cause data processing apparatus to perform operations comprising:
    associating an animation with the slide, the animation having a defined animation path;
    identifying the face region as a position in the animation path; and
    animating the slide based on the associated animation.

12. A computer-implemented method of animating a slide, the method comprising:
    inserting an image into a slide, the image having associated facial detection information;
    analyzing the facial detection information to determine a location of an included face;
    selecting an animation style;
    defining an animation path based on the selected animation style, wherein a point in the animation path corresponds to the location of the included face
    selecting the included face as a point in the animation path based on a number of occurrences of the included face in an image collection; and
    animating the slide in accordance with the defined animation path.

13. The computer-implemented method of claim 12, wherein selecting an animation style further comprises:
    excluding an animation style associated with a preceding slide.

14. The computer-implemented method of claim 12, further comprising:
    determining a layout of the slide based on one or more dimensions of the image.

15. The computer-implemented method of claim 12, further comprising:
    identifying a location of a second included face in the image; and
    configuring the location of the second face as a second point in the animation path.

16. A computer program product, encoded on a non-transitory computer-readable storage device, operable to cause data processing apparatus to perform operations comprising:
    inserting an image into a slide, the image having associated facial detection information;
    analyzing the facial detection information to determine a location of an included face;
    selecting an animation style based on the facial detection information;
    defining an animation path based on the selected animation style, wherein a point in the animation path corresponds to the location of the included face; and
    animating the slide in accordance with the defined animation path.

17. The computer program product of claim 16, further operable to cause data processing apparatus to perform operations comprising:
    determining a layout of the slide based on one or more dimensions of the image.

18. The computer program product of claim 16, further operable to cause data processing apparatus to perform operations comprising:
    identifying a location of a second included face in the image; and
    configuring the location of the second face as a second point in the animation path.

19. The computer program product of claim 16, further operable to cause data processing apparatus to perform operations comprising:
    selecting the included face as a point in the animation path based on one or more dimensions of the included face.

20. A system comprising:
    a computer-readable medium storing an image collection and a plurality of slide layouts; and
    a computing system including processor electronics configured to perform operations comprising:
    selecting an image from the image collection, the image having associated facial detection information;
    determining, based on the facial detection information, a face region in the selected image that includes one or more faces;
    cropping the selected image based on the determined face region to generate a cropped image depicting the included one or more faces;
    determining a slide layout based on dimensions corresponding to the cropped image; and
    inserting the cropped image into a slide associated with a slideshow.

21. The system of claim 20, wherein selecting an image further comprises:
    determining that the image corresponds to a subject of the slideshow.

22. The system of claim 20, the operations further comprising:
    identifying a drop-zone included in the slide; and
    associating the cropped image with the identified drop-zone.

23. The system of claim 22, the operations further comprising:
    determining one or more drop-zone dimensions; and
    generating the cropped image in accordance with the determined one or more drop-zone dimensions.

24. The system of claim 20, wherein cropping the selected image further comprises:
    defining a crop region such that the included one or more faces are positioned near a center of the cropped image.

25. The system of claim 20, the operations further comprising:
    associating an animation with the slide, the animation having a defined animation path;
    identifying the face region as a position in the animation path; and
    animating the slide based on the associated animation.

26. A computer-implemented method of presenting a slide, the method comprising:
    accessing a slide associated with a slideshow;
    determining an animation starting position associated with the slide, wherein the animation starting position is based on facial detection information;
    determining an animation style associated with the slide, wherein the animation style is based on facial detection information;
    determining an animation ending position associated with the slide; and
    presenting a slide animation, in accordance with the animation style and an animation path, from the animation starting position to the animation ending position.

27. The computer-implemented method of claim 26, further comprising:
    presenting a preceding slide associated with the slideshow;
    executing a transition from the preceding slide to the slide; and
    presenting the animation starting position associated with the slide.

28. The computer-implemented method of claim 26, further comprising:
    detecting an end of the slide animation; and
    executing a transition from the slide to a succeeding slide.

29. The computer-implemented method of claim 26, further comprising:
    determining a starting crop associated with the slide, wherein the starting crop is based on facial detection information.

30. The computer-implemented method of claim 26, wherein:
    the animation path includes a zoom with respect to a detected face location.

31. A computer program product, encoded on a non-transitory computer-readable storage device, operable to cause data processing apparatus to perform operations comprising:
    accessing a slide associated with a slideshow;
    determining an animation starting position associated with the slide, wherein the animation starting position is based on facial detection information;
    determining an animation style associated with the slide, wherein the animation style is based on facial detection information;
    determining an animation ending position associated with the slide; and
    presenting a slide animation, in accordance with the animation style and an animation path, from the animation starting position to the animation ending position.

32. The computer program product of claim 31, further operable to cause data processing apparatus to perform operations comprising:
    presenting a preceding slide associated with the slideshow;
    executing a transition from the preceding slide to the slide; and
    presenting the animation starting position associated with the slide.

33. The computer program product of claim 31, further operable to cause data processing apparatus to perform operations comprising:
    detecting an end of the slide animation; and
    executing a transition from the slide to a succeeding slide.

34. The computer program product of claim 31, further operable to cause data processing apparatus to perform operations comprising:
    determining a starting crop associated with the slide, wherein the starting crop is based on facial detection information.

35. The computer program product of claim 31, wherein the animation path includes a zoom with respect to a detected face location.

* * * * *

UNITED STATES PATENT AND TRADEMARK OFFICE
CERTIFICATE OF CORRECTION

PATENT NO. : 8,907,984 B2
APPLICATION NO. : 12/565679
DATED : December 9, 2014
INVENTOR(S) : Ralf Weber and Robert Van Osten It is certified that error appears in the above-identified patent and that said Letters Patent is hereby corrected as shown below:

Title Page, References Cited, Other Publications, Dwayne Ferguson (both occurrences), delete "Applie" and insert --Apple-- therefor.

Signed and Sealed this
Fourteenth Day of April, 2015

Michelle K. Lee
*Director of the United States Patent and Trademark Office*